United States Patent

Steensma

[11] 4,086,484
[45] Apr. 25, 1978

[54] OPTICAL AMPLITUDE MODULATION MODULATOR

[75] Inventor: Peter Dennis Steensma, Midland Park, N.J.

[73] Assignee: International Telephone and Telegraph Corporation, Nutley, N.J.

[21] Appl. No.: 705,217

[22] Filed: Jul. 14, 1976

[51] Int. Cl.² .............................................. H04B 9/00
[52] U.S. Cl. .................................... 250/199; 358/901; 332/7.51; 350/96.10
[58] Field of Search ........................ 280/199; 232/7.51; 350/96 WG; 358/901

[56] References Cited

U.S. PATENT DOCUMENTS 3,920,982  11/1975  Harris .................................. 332/7.51
4,000,416  12/1976  Goell ............................. 350/96 WG Primary Examiner—Robert L. Griffin
Assistant Examiner—Edward L. Coles
Attorney, Agent, or Firm—John T. O'Halloran; Alfred C. Hill

[57] ABSTRACT

An amplitude modulation modulated acoustic wave is coupled to a selected region along the length of an optical fiber waveguide transmitting an optical beam to modulate at least one transmission characteristic of the waveguide in the selected region by the amplitude modulation of the modulated acoustic wave to impart the amplitude modulation of the modulated acoustic wave to the optical beam.

19 Claims, 6 Drawing Figures

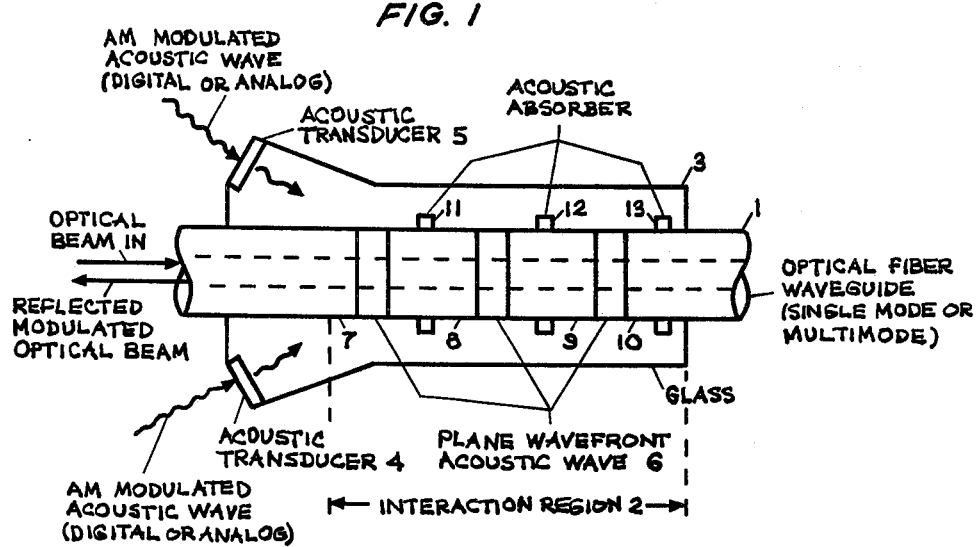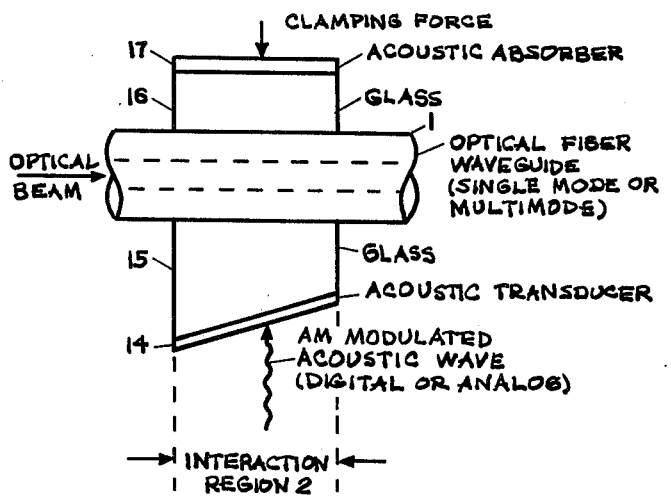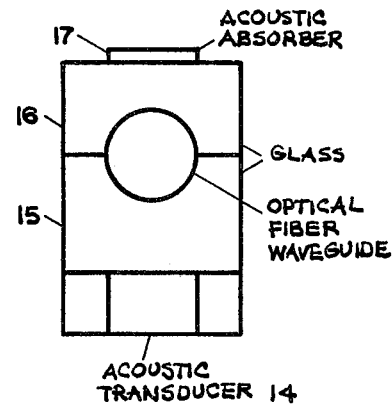

OPTICAL AMPLITUDE MODULATION MODULATOR

BACKGROUND OF THE INVENTION

This invention relates to optical communication systems and more particularly to an amplitude modulation (AM) modulator for such systems.

To date the bulk of the fiber optics development have been directed and motivated by the trunk communications problem of providing more megabits point to point for less money. Further development of fiber optic trunks can be expected to attempt to obtain higher bit rates, and longer repeater spacings as well as improved reliability and sophistication. However, high bit rate trunks, (i.e., greater than 30 megabits per second (mb/s)) have been a peculiarly commercial long lines application rather than a military one.

Rather than pursue the application of fiber optics to higher levels of the hierarchy, which in the military are either non-existent or carried by radio/satellite it would appear pertinent to start asking what impact fiber optics can make at lower levels such as the local loop. With the military this would include not only strategic and tactical voice and data subscribers, but also intra-vehicle communications, such as shipboard and aircraft. Since the ability to compete on a cost basis with conventional twisted pair is not obvious, except for limited special purpose applications, it seems the major thrust in this development will be techniques to reconfigure existing systems on a single wire data bus basis, simultaneously trading off switch costs and cost of many twisted pair lines against a single fiber and interface electronics. When this is done the inherently wider bandwidth potentials of the optical fiber begin to translate into economic advantage even at the lowest levels of the communication network.

The data bus architecture for direct subscriber interface has by no means been completely ignored in the last few years. Motivations for considering this approach have included: (1) lower cost per line, (2) flexible installation and expansion, (3) electromagnetic interference (EMI) and electromagnetic pulse (EMP), and (4) small size.

At low data rates, buses are commonly implemented in digital equipment. With higher data rates and longer paths, implementation of data buses requires that considerable care be exercised in maintaining a matched impedance at all points. Otherwise spurious reflections can render the system inoperative. Systems using both analog and digital data and a loop configuration have been implemented by a variety of companies. These systems have been proposed as offering solutions to problems plaguing operational systems, such as command report center, field army headquarters communications and shipboard internal communications.

Data bus systems based on fiber optics technology have been investigated mainly for airframe use. All systems to date have been based on the use of bundle optical fiber technology and a star configuration with all wires coming into a central node where crosstalk is deliberately introduced to allow separate users to talk with each other. Because of the launching conditions on fibers, reflections are minimal so such a system is possible. Star communication systems allow various users to be in contact with only one intervening node but require 2N wires for N users, have limited flexibility and pose synchronization difficulties that demand increased interface equipment complexity and under utilization of the available bandwidth of the optical fiber.

Fiber optic loop systems eliminate many of the disadvantages of the star communication systems but presently have two limitations. First of all, the only drop and insert capability that has been demonstrated has been by dissection of an optical fiber bundle and use of a mixing rod following the bundle, which is lossy and inflexible. Secondly, for a reasonable number of users the loss encountered at each junction rapidly adds up to more than the allowable attenuation for typical solid state light sources and state of the art light receivers. If these two difficulties can be solved, however, it will be possible to construct a system that can take full advantage of the bandwidth capability of the optical fiber, use a minimum number of optical fibers and simple interface electronics to allow optical fibers to be used in the local loop with economic and performance advantages.

During a study of intrusion techniques for optical fibers, it was determined that an optical fiber immersed in an acoustic field or wave of proper spatial orientation and frequency will scatter light out of the optical fiber. Subsequently some of the details of the interaction were investigated and the process proved to be a rather strong one. This can be expected quite simply because a sound wave (acoustic wave) and a light wave will interact strongly when they have the same wavelength. But the ratio of the velocity of sound in a solid to the velocity of light is on the order of $10^5$, so the frequency of the sound wave having the same wavelength as a light wave is $10^5$ less. Since the energy in a photon (light wave quantum) and in a phonon (sound wave quantum) is determined by its frequency, then a photon that is $10^5$ times more energetic than a phonon can be controlled by a phonon. The analogy to a triode is obvious. Practicability of gain will be determined by the cross section for the interaction and the intensity of the background thermal phonons, but even in lieu of gain a useful modulator results. For a single mode waveguide a simplified analysis predicts that 80 – 90% modulation of the optical beam occurs with about 2 watts of VHF (very high frequency) power acoustic waves. Similar results can be expected with multimode waveguides, but more care in shaping the acoustic wave or its drive waveform must be exercised.

An interesting thing about this result is that although it is quite easy to receive light from a single optical fiber without breaking the fiber by placing a detector and index matching liquid or plastic in contact with the fiber, there has been no way of inserting light into the optical fiber at any arbitrary position along its length without breaking it. One approach to this problem suggested was to insert a phase modulation on the light beam from a source at the input to the optical fiber by mechanically stretching the optical fiber and then providing coherent detection at the other end of the optical fiber. This allows a series of talkers to input information to the end of the optical fiber from any point along the fiber, but did not provide the ability to receive and talk at any point along the optical fiber. This was because coherent detection requires the spatial superposition of a reference carrier and the information character, and a good reference carrier was impossible to obtain. If however, an amplitude modulation is applied to the light beam in the optical fiber by allowing it to interact with an acoustic field, then there can be provided convenient reception by means of intensity detection of power in the optical fiber and convenient transmission.

SUMMARY OF THE INVENTION

An object of the present invention is to provide an improved simple optical AM modulator.

Another object of the present invention is to provide an optical AM modulator that requires no coherent reference and no delicate superposition of two waves on a detector.

Another object of the present invention is to provide a simple switch or AM modulator that a single source of continuous power or pulsed power can be used and each user can insert his information by changing at least one transmission character of the optical fiber at his point to either insert analog or digital modulation on the optical beam.

A feature of the present invention is the provision of an AM modulator for at least one optical beam comprising: an optical fiber waveguide transmitting the optical beam therealong; and an AM modulated acoustic wave coupled to a selected region of the waveguide along its length to modulate at least one transmission characteristic of the waveguide in the selected region by the AM of the modulated acoustic wave to impart the AM of the modulated acoustic wave to the optical beam.

Another feature of the present invention is the provision of a method of amplitude modulating at least one optical beam being transmitted through an optical fiber waveguide comprising the step of: coupling an AM modulated acoustic wave to a selected region of the waveguide along its length to modulate at least one transmission characteristic of the waveguide in the selected region by the AM of the modulated acoustic wave to impart the AM of the modulated acoustic wave to the optical beam.

BRIEF DESCRIPTION OF THE DRAWING

Above-mentioned and other features and objects of this invention will become more apparent by reference to the following description taken in conjunction with the accompanying drawing, in which:

FIG. 1 is a schematic diagram of one embodiment of the optical AM modulator in accordance with the principles of the present invention;

FIG. 2 is a schematic diagram of a second embodiment of the optical AM modulator in accordance with the principles of the present invention;

FIG. 3 is an end view of FIG. 2;

DESCRIPTION OF THE PREFERRED EMBODIMENT

Figure 4:
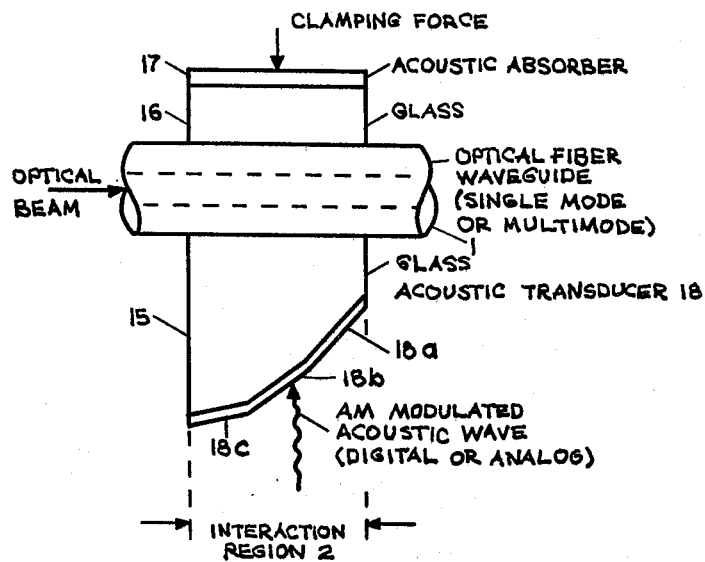
FIG. 4 is a shcematic diagram of a third embodiment of the optical AM modulator in accordance with the principles of the present invention.

Referring to FIG. 1 there is schematically illustrated a first embodiment of an optical AM modulator in accordance with the principles of the present invention which is a direct analog of a microwave bandstop filter employing periodic discontinuities. In this case the discontinuity is a sinusoidal modulation of a transmission characteristic of the optical fiber material, such as the index of refraction of the optical fiber material, induced by an AM modulated acoustic wave. The embodiment of FIG. 1 includes an optical fiber waveguide 1 transmitting therealong at least one optical beam where the optical fiber waveguide 1 may be a single mode fiber of a multimode fiber. At a selected region of waveguide 1, identified in FIG. 1 as interaction region 2, there is disposed an arrangement 3 for launching an AM modulated acoustic wave into interaction region 3 so as to interact with waveguide 1 so as to modulate the index of refraction of waveguide 1 by the AM of the modulated acoustic wave. Arrangement 3 composed of a suitable material, such as glass, surrounds waveguide 1 and includes at one end thereof acoustic transducers 4 and 5 for receiving the identical AM modulated acoustic wave and launching this wave in the form of plane wavefront acoustic waves 6 for interaction with waveguide 1 to modulate the index of refraction of waveguide 1 by the AM of the modulated acoustic wave and, hence, AM modulate the optical beam or beams in waveguide 1. Transducers 4 and 5 may be any of the well known acoustic transducers. One example of such an acoustic transducer is a thin film piezoelectric material formed on the surface of the glass of arrangement 3 in the position illustrated.

The AM modulated acoustic wave may be digital in nature or analog in nature. When the modulated acoustic wave is digital in nature the acoustic wave will be in the form of the presence and absence of pulses of the acoustic wave according to a predetermined digital code to convey a users intelligence into interaction region 2 for interaction with waveguide 1. When the modulated acoustic wave is analog in nature, the acoustic wave is continuous and is amplitude modulated to convey the users intelligence into interaction region 2 for interaction with waveguide 1. The modulated acoustic wave of the other embodiments of the present invention also may be digital or analog in nature and, thus, will take the form just described.

When the periodicity of the modulated acoustic wave is half of the periodicity of the optical beam in waveguide 1, the AM modulated optical beam will be reflected from region 2. In the case of a single mode waveguide excited by a light source of small spectral width, only one spatial frequency will be present in waveguide 1 and by attenuating this mode a high modulation index can be obtained. With a multimode waveguide a range of spatial frequencies are present in the waveguide, some of which may fall outside the stop band of the filter imposed by the modulated acoustic wave. The width of this stop band is determined by the strength of the index of refraction variation imposed on the core of the optical fiber which in turn depends on the intensity of the modulated acoustic wave. However, if a limited maximum amount of power is available a broader stop band can be formed by using a modulated acoustic wave having a number of frequency components which may be either applied to waveguide 1 in series or in superposition.

The magnitude of the attenuation of the light in crossing the filter or interaction region 2 of finite width depends on the reflection in one period and the number of periods in the interaction region. Approximately the reflection coefficient equals $$(ep\frac{n^3 L}{2\lambda})^2,$$

where $e$ is equal to the strain caused by the acoustic wave, $p$ is the photoelastic constant of the waveguide material (Pockels constant), $n$ is equal to the index of refraction of the waveguide material, $\lambda$ is equal to the wavelength of light and $L$ is the length of interaction region 2.

It is obvious from the foregoing equation that increasing the interaction length increases the total reflection. However, increasing the interaction length decreases the maximum modulation rate since upon removing the input power a time $L/v$, where $v$ is equal to the velocity of the modulated acoustic wave, will be required for the acoustic wave to move out of the interaction region into an acoustic absorber. This effect can be somewhat reduced by breaking interaction region 2 into a series of shorter regions 7 – 10 interspersed with acoustic absorbers 11 – 13. The acoustic absorbers may be any known material capable of absorbing an acoustic wave, such as rubber, silicone, or wax and the like. Optically such an arrangement will behave as a series of filters. In terms of the modulated acoustic wave the regions 7 – 10 will be in parallel. A more serious drawback to the direct analog of a microwave filter occurs when it is considered that for an acoustic velocity of $6 \times 10^5$ cm/sec (centimeter per second) and an optical wavelength of $10^{-4}$ cm a drive frequency of 6 GHz (gigahertz) would be required. Although transducer technology is available in this frequency range, power is rather expensive.

Fortunately, optical waveguides are an open waveguide, so that it is not necessary to only reflect power in the incident bound mode, but rather it is possible to couple energy to radiation modes. Deflection of acoustic waves through angles other than 180° by periodic structures is well known in solid state theory as the Bragg angle phenomenon. The angle of such deflections is defined by $$\sin \theta_B = \tfrac{1}{2} \lambda/\Lambda$$

, where $\lambda$ is equal to the optical wavelength of the optical beam, $\Lambda$ is equal to the acoustic wavelength of the modulated acoustic wave and $\theta$ is equal to the Bragg angle for reflection. From this equation it is apparent that deflection through small angles can be caused by sufficiently low frequency acoustic waves. But a small deflection angle is all that is required to allow a bound mode in an optical waveguide to escape as radiation, because the critical angle for the total internal reflection is exceeded.

Referring to FIGS. 2 and 3 there is illustrated an optical AM modulator employing a single angle Bragg cell switch including an acoustic transducer 14, such as a thin film piezoelectric material, coated on a glass member 15 which encircles one-half of optical fiber waveguide 1 and a second glass member 16 encircling the other half of waveguide 1 with an acoustic absorber 17 formed on the outer edge of glass member 17 as illustrated. The acoustic absorber may be composed of the same material referred to hereinabove with respect to acoustic absorbers 11 – 13 of FIG. 1. The glass members 15 and 16 have a clamping force applied thereto so that the acoustic wave sees a good solid mechanical contact between waveguide 1 and the glass members 15 and 16. One such clamping force arrangement could be a C clamp. Other similar clamping arrangements are also available.

The modulated acoustic wave is set up in the glass or other appropriate material which is clamped against waveguide 1. It is possible to provide a fluid intermediate the glass members 15 and 16 and waveguide 1 to facilitate coupling the modulated acoustic wave into waveguide 1. Similar arrangements are used in non-destructive testing applications and in studies of photo elastic coefficients of materials. The angle of incidence of the modulated acoustic wave on waveguide 1 is controlled by the angle of transducer 14. Transducer 14, which may be a thin film piezoelectric transducer, will be electrically matched the AM modulated acoustic wave source. The single angle Bragg switch or modulator of FIGS. 2 and 3 can be used to either modulate the index of refraction of a conventional single mode or multimode waveguide 1. In the case of a multimode waveguide 1 a sufficient range of drive frequencies must be coupled to transducer 14 to assure a significant interaction with the majority of optical waves or beams in the waveguide 1, or else a range of directions and a single frequency acoustic wave source can be used.

Figure 5:
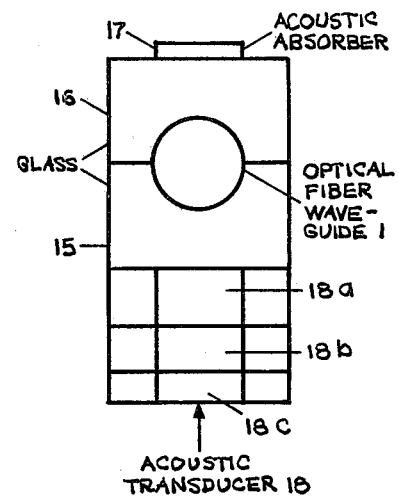
FIG. 5. is an end view of FIG. 4.

The range of directions can be provided by means of a multiangle Bragg cell switch as illustrated in FIGS. 4 and 5 wherein the only change from FIGS. 2 and 3 is the various angles of the portions 18a, 18b and 18c of acoustic transducer 18 as illustrated.

Figure 6:
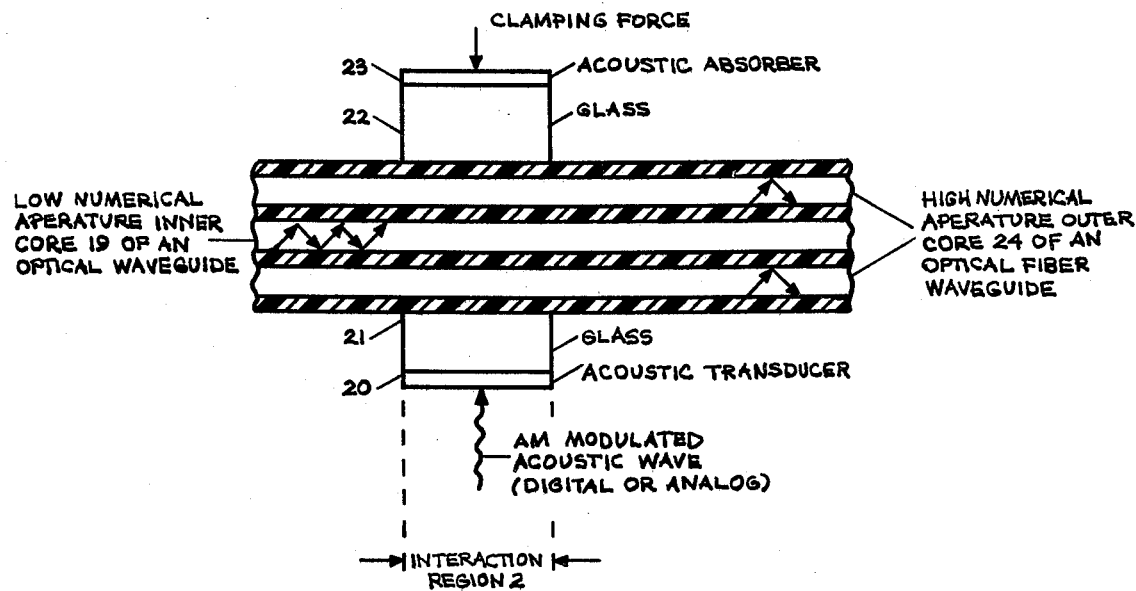
FIG. 6 is a schematic diagram of a fourth embodiment of the optical AM modulator in accordance with the principles of the present invention.

FIG. 6 illustrates schematically a double core optical fiber waveguide including an inner core 19 having a low numerical aperture which will be significantly deflected by a single angle, single frequency AM modulated acoustic wave coupled through acoustic transducer 20 and glass member 21. A glass member 22 is positioned in interaction region 2 opposite glass member 21 as illustrated in FIGS. 3 and 5 upon the outer surface of which is disposed an acoustic absorber 23. The outer core 24 of the double core optical fiber has a high numerical aperture so that all radiation emerging from center core 19 due to the modulated acoustic wave will be captured and guided by the outer core 24. Since the outer core 24 is much closer to the outside of the optical fiber waveguide, coupling to a detector mounted on the outside is much stronger than from inner core 19.

The modulation speed of the optical AM modulators of FIGS. 1 – 6 is determined by the time it takes all elements of the modulated acoustic wave to reach the edge of the core of waveguide 1, and the time to traverse the core region. Specifically, $$T_{rise} = \frac{W\sin\theta_B + D}{v\cos\theta_B},$$

where $W$ is equal to the width of the transducer, $D$ is the width of the waveguide core, $v$ is the velocity of the acoustic wave and $\theta_B$ is the angle of the transducer (Bragg angle). For practical dimensions modulation rates to 100 mb/s are obtainable.

While I have described above the principles of my invention in connection with specific apparatus it is to be clearly understood that this description is made only by way of example and not as a limitation to the scope of my invention as set forth in the objects thereof and in the accompanying claims.

I claim:

1. An amplitude modulation modulator for at least one optical beam comprising:
    an optical fiber waveguide transmitting said optical beam therealong; and
    an amplitude modulation modulated acoustic wave coupled to a selected region of said waveguide along its length to modulate at least one transmission characteristic of said waveguide in said selected region by said amplitude modulation of said modulated acoustic wave to impart said amplitude modulation of said modulated acoustic wave to said optical beam;

said selected region including
a plurality of shorter regions in a series relationship with each other, and
an acoustic absorber disposed between adjacent ones of said plurality of shorter regions.

2. A modulator according to claim 1, wherein
said waveguide has a longitudinal axis, and
said modulated acoustic wave is launched toward said waveguide at a given angle with respect to said axis, said acoustic wave having a plane wavefront in said selected region traveling along said axis.

3. A modulator according to claim 1, wherein said amplitude modulation is digital in nature.

4. A modulator according to claim 1, wherein said amplitude modulation is analog in nature.

5. A modulator according to claim 1, wherein said transmission characteristic is an index of refraction.

6. A modulator according to claim 5, wherein said amplitude modulation is digital in nature.

7. A modulator according to claim 5, wherein said amplitude modulation is analog in nature.

8. An amplitude modulation modulator for at least one optical beam comprising:
an optical fiber waveguide transmitting said optical beam therealong;
an amplitude modulation modulated acoustic wave coupled to a selected region of said waveguide along its length to modulate at least one transmission characteristic of said waveguide in said selected region by said amplitude modulation of said modulated acoustic wave to impart said amplitude modulation of said modulated acoustic wave to said optical beam;
said waveguide having a longitudinal axis; and
a single angle Bragg cell switch disposed at said selected region and surrounding said waveguide to receive said modulated acoustic wave launched perpendicular to said axis to enable said modulated acoustic wave to modulate said transmission characteristic of said selected region.

9. A modulator according to claim 8, wherein said amplitude modulation is digital in nature.

10. A modulator according to claim 8, wherein said amplitude modulation is analog in nature.

11. A modulator according to claim 8, wherein said transmission characteristic is an index of refraction.

12. A modulator according to claim 11, wherein said amplitude modulation is digital in nature.

13. A modulator according to claim 11, wherein said amplitude modulation is analog in nature.

14. An amplitude modulation modulator for at least one optical beam comprising:
an optical fiber waveguide transmitting said optical beam therealong;
an amplitude modulation modulated acoustic wave coupled to a selected region of said waveguide along its length to modulate at least one transmission characteristic of said waveguide in said selected region by said amplitude modulation of said modulated acoustic wave to impart said amplitude modulation of said modulated acoustic wave to said optical beam;
said waveguide having a longitudinal axis; and
a multiangle Bragg cell switch disposed at said selected region and surrounding said waveguide to receive said modulated acoustic wave launched perpendicular to said axis to enable said modulated acoustic wave to modulate said transmission characteristic of said selected region.

15. A modulator according to claim 14, wherein said amplitude modulation is digital in nature.

16. A modulator according to claim 14, wherein said amplitude modulation is analog in nature.

17. A modulator according to claim 14, wherein said transmission characteristic is an index of refraction.

18. A modulator according to claim 17, wherein said amplitude modulation is digital in nature.

19. A modulator according to claim 17, wherein said amplitude modulation is analog in nature.

* * * * *